(12) United States Patent
Pfau et al.

(10) Patent No.: US 12,307,376 B2
(45) Date of Patent: May 20, 2025

(54) TRAINING SPECTRAL INFERENCE NEURAL NETWORKS USING BILEVEL OPTIMIZATION

(71) Applicant: DeepMind Technologies Limited, London (GB)

(72) Inventors: David Benjamin Pfau, London (GB); Stig Petersen, Royston (GB); Ashish Agarwal, Sunnyvale, CA (US); David Barrett, London (GB); Kimberly Stachenfeld, London (GB)

(73) Assignee: DeepMind Technologies Limited, London (GB)

( * ) Notice: Subject to any disclaimer, the term of this patent is extended or adjusted under 35 U.S.C. 154(b) by 1104 days.

(21) Appl. No.: 16/972,491

(22) PCT Filed: Jun. 6, 2019

(86) PCT No.: PCT/EP2019/064790
§ 371 (c)(1),
(2) Date: Dec. 4, 2020

(87) PCT Pub. No.: WO2019/234156
PCT Pub. Date: Dec. 12, 2019

(65) Prior Publication Data
US 2021/0166131 A1 Jun. 3, 2021

Related U.S. Application Data

(60) Provisional application No. 62/681,621, filed on Jun. 6, 2018.

(51) Int. Cl.
*G06N 3/088* (2023.01)
*G06N 20/00* (2019.01)

(52) U.S. Cl.
CPC ............ *G06N 3/088* (2013.01); *G06N 20/00* (2019.01)

(58) Field of Classification Search
CPC ........ G06N 3/088; G06N 20/00; G06N 3/006; G06N 5/01; G06N 20/10
See application file for complete search history.

(56) References Cited

U.S. PATENT DOCUMENTS

| | | | |
|---|---|---|---|
| 2015/0227802 A1* | 8/2015 | Anderson | G06V 10/95 382/157 |
| 2018/0032868 A1* | 2/2018 | Dani | G06V 40/28 |

OTHER PUBLICATIONS

Shilton et al., "Covariance Function Pre-Training with m-Kernels for Accelerated Bayesian Optimisation," in arXiv preprint arXiv:1802. 05370v1 Feb. 15, 2018, 12 pages. (Year: 2018).*
O'Donoghue et al., "Combining policy gradient and q-learning," Published as a Conference Paper at ICLR 2017, arXiv preprint arXiv:1611.01626, Nov. 2016, 15 pages.
Anandkumar et al., "A spectral algorithm for latent dirichlet allocation," Algorithmica, May 2015, 72(1):193-214.

(Continued)

*Primary Examiner* — Kc Chen
(74) *Attorney, Agent, or Firm* — Fish & Richardson P.C.

(57) ABSTRACT

Methods, systems, and apparatus, including computer programs encoded on computer storage media, for training a neural network having a plurality of network parameters and being configured to process an input data item to generate a feature representation comprising a values for each of a plurality of features of the input data item.

18 Claims, 3 Drawing Sheets

(56) References Cited

OTHER PUBLICATIONS

Barreto et al., "Successor features for transfer in reinforcement learning," arXiv preprint arXiv:1606.05312, Jun. 2016, 24 pages.
Belkin et al., "Laplacian eigenmaps and spectral techniques for embedding and clustering," Nips, Dec. 2001, 585-591.
Bellemare et al., "The arcade learning environment: An evaluation platform for general agents," Journal of Artificial Intelligence Research, Jun. 2013, 47:253-79.
Bengio et al., "Out-of-sample extensions for lle, isomap, mds, eigenmaps, and spectral clustering," Advances in neural information processing systems, Dec. 2004, 16:177-84.
Bengio et al., "Slow, decorrelated features for pretraining complex cell-like networks," Advances in neural information processing systems, 2009, 22:99-107.
Bittner et al., "Interrogating theoretical models of neural computation with deep inference," bioRxiv, Jan. 2019, 52 pages.
Blunt et al., "Krylov-projected quantum Monte Carlo method," Physical review letters, Jul. 2015, 115(5):050603.
Boots et al., "Closing the learning-planning loop with predictive state representations," The International Journal of Robotics Research, Jun. 2011, 30(7):954-66.
Borkar et al., Stochastic approximation with two time scales. Systems & Control Letters, Feb. 1997, 29(5):291-4.
Bruna et al., "Spectral networks and locally connected networks on graphs," arXiv preprint arXiv:1312.6203, Dec. 2013, 14 pages.
Carleo et al., "Solving the quantum many-body problem with artificial neural networks," Science, Feb. 2017, 355(6325):602-6.
Choo et al., "Symmetries and many-body excitations with neural-network quantum states," Physical review letters, Oct. 2018, 121(16):167204.
Daskalakis et al., "A converse to Banach's fixed point theorem and its CLS-completeness," Proceedings of the 50th Annual ACM SIGACT Symposium on Theory of Computing, Jun. 2018, 44-50.
Edelman et al., "The geometry of algorithms with orthogonality constraints," SIAM journal on Matrix Analysis and Applications, 1998, 20(2):303-53.
Espeholt et al., "Impala: Scalable distributed deep-rl with importance weighted actor-learner architectures," International Conference on Machine Learning, Jul. 2018, 1407-1416.
Foulkes et al., "Quantum Monte Carlo simulations of solids," Reviews of Modern Physics, Jan. 2001, 73(1):33.
Franzius et al., "Slowness and sparseness lead to place, head-direction, and spatial-view cells," PLoS Comput Biol, Aug. 2007, 3(8):e166.
Giles et al., "An extended collection of matrix derivative results for forward and reverse mode automatic differentiation," Oxford University Computing Laboratory, Parks Road, Oxford, U.K, Jan. 2008, 23 pages.
Harju et al.,"Stochastic gradient approximation: An efficient method to optimize many-body wave functions," Physical review letters, Aug. 1997, 79(7):1173.
Hsu et al., "A spectral algorithm for learning hidden Markov models," Journal of Computer and System Sciences, Sep. 2012, 78(5):1460-80.
Huang et al., "Decorrelated batch normalization," Proceedings of the IEEE Conference on Computer Vision and Pattern Recognition, 2018, 791-800.
Ionescu et al., "Matrix backpropagation for deep networks with structured layers," Proceedings of the IEEE International Conference on Computer Vision, 2015, 2965-2973.
Kompella et al., "Incremental slow feature analysis: Adaptive and episodic learning from high-dimensional input streams," arXiv preprint arXiv:1112.2113, Dec. 2011, 33 pages.
Kompella et al., "Incremental slow feature analysis: Adaptive low-complexity slow feature updating from high-dimensional input streams," Neural Computation, Nov. 2012, 24(11):2994-3024.

Cranmer et al., "Quantum Inference and Quantum Flows," Center for Cosmology and Particle Physics, 2018, 43 pages.
Loaiza-Ganem et al., "Maximum entropy flow networks," arXiv preprint arXiv:1701.03504, Jan. 2017, 13 pages.
Machado et al., "A laplacian framework for option discovery in reinforcement learning," International Conference on Machine Learning, Jul. 2017, 2295-2304.
Machado et al., "Eigenoption discovery through the deep successor representation," arXiv preprint arXiv:1710.11089, Oct. 2017, 22 pages.
Mahadevan et al., "Proto-value Functions: A Laplacian Framework for Learning Representation and Control in Markov Decision Processes," Journal of Machine Learning Research, Oct. 2007, 63 pages.
Murray et al., "Differentiation of the Cholesky decomposition," arXiv preprint arXiv:1602.07527, Feb. 2016, 18 pages.
Ng et al., "On spectral clustering: Analysis and an algorithm," Advances in neural information processing systems, Sep. 2002, 2:849-56.
Oja et al., "Simplified neuron model as a principal component analyzer," Journal of mathematical biology, Nov. 1982, 15(3):267-73.
Pan et al., "The complexity of the algebraic eigen problem," Mathematical Sciences Research Institute, Berkeley, Dec. 1998, 14:1998-71.
PCT International Preliminary Report on Patentability in International Appln. No. PCT/EP2019/064790, dated Dec. 17, 2020, 9 pages.
PCT International Search Report and Written Opinion in International Appln. No. PCT/EP2019/064790, dated Sep. 23, 2019, 15 pages.
Pfau et al., "Connecting generative adversarial networks and actor-critic methods," arXiv preprint arXiv:1610.01945, Oct. 2016, 10 pages.
Roweis et al., "Nonlinear dimensionality reduction by locally linear embedding," Science, Dec. 2000, 290(5500):2323-6.
Shaham et al., "Spectralnet: Spectral clustering using deep neural networks," arXiv preprint arXiv:1801.01587, Jan. 2018, 21 pages.
Shi et al., "Normalized cuts and image segmentation," IEEE Transactions on pattern analysis and machine intelligence, Aug. 2000, 22(8):888-905.
Shi et al.,"A spectral approach to gradient estimation for implicit distributions," International Conference on Machine Learning, Jul. 2018, 4644-4653.
Shirhatti et al., "Effect of reference scheme on power and phase of the local field potential," Neural Computation, May 2016, 28(5):882-913.
Sprekeler et al., "On the relation of slow feature analysis and laplacian eigenmaps," Neural Computation, Dec. 2011, 23(12):3287-302.
Stachenfeld et al., "The hippocampus as a predictive map," Nature Neuroscience, Nov. 2017, 20(11):1643.
Sun et al., "DL-SFA: Deeply-learned slow feature analysis for action recognition," Proceedings of the IEEE conference on computer vision and pattern recognition, 2014, 2625-2632.
Szegedy et al., "Going deeper with convolutions, 1-9," IEEE Conference on Computer Vision and Pattern Recognition (CVPR), 2015, 12 pages.
Tenenbaum et al., "A global geometric framework for nonlinear dimensionality reduction," Science, Dec. 2000, 290(5500):2319-23.
Toulouse et al., "Introduction to the variational and diffusion Monte Carlo methods," Advances in Quantum Chemistry, Jan. 2016, 73:285-314.
Wiskott et al., "Slow feature analysis: Unsupervised learning of invariances," Neural Computation, Apr. 2002, 14(4):715-70.
Wyss et al., "A model of the ventral visual system based on temporal stability and local memory," PLoS Biol., Apr. 2006, 4(5):e120.
Yang et al., "Analytic solution of a two-dimensional hydrogen atom," Nonrelativistic Theory Physical Review A, Feb. 1991, 43(3):1186.

\* cited by examiner

TRAINING SPECTRAL INFERENCE NEURAL NETWORKS USING BILEVEL OPTIMIZATION

This application is a National Stage Application under 35 U.S.C. § 371 and claims the benefit of International Application No. PCT/EP2019/064790, filed Jun. 6, 2019, which claims priority to U.S. Application No. 62/681,621, filed Jun. 6, 2018, entitled SPECTRAL NEURAL NETWORKS, the disclosure of which is incorporated herein by reference.

BACKGROUND

This specification relates to training neural networks to generate representations of network inputs.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that trains a neural network that has network parameters and that is configured to receive an input data item and to process the input data item to generate a feature representation of the input data item in accordance with the network parameters. The feature representation includes a respective value for each of a plurality of features of the input data item.

Thus in one aspect there is described a method of training a neural network having a plurality of network parameters and being configured to process an input data item to generate a feature representation comprising (respective) values for each of a plurality of features of the input data item. The method may comprise maintaining (data specifying) a covariance measure of the features (during the training) and a Jacobian of the covariance measure. The method may further comprise receiving a mini-batch comprising a plurality of pairs of training input data items. The method may further comprise processing each training input data item in the mini-batch using the neural network in accordance with current values of the network parameters to generate a respective feature representation of each of the training input data items. The method may further comprise determining, from the respective feature representations of each pair of training input data items in the mini-batch, a covariance (measure) update to the covariance measure. The method may further comprise updating, using the covariance measure update, the covariance measure. The method may further comprise determining, from the covariance measure update, a Jacobian update to the Jacobian of the covariance measure. The method may further comprise updating, using the Jacobian update, the Jacobian of the covariance measure. The method may further comprise determining, for each pair of training input data items, a respective kernel output. The method may further comprise determining, from the respective feature representations of each pair of training input data items in the mini-batch and the respective kernel output for each pair of training input data items, a kernel-weighted mini-batch covariance estimate. The method may further comprise determining, using the updated Jacobian of the covariance measure, the updated covariance measure, and the kernel-weighted mini-batch covariance estimate, a gradient estimate with respect to the network parameters. The method may further comprise updating the current values of the network parameters using the gradient estimate.

The kernel output may comprise the output of a kernel function of a pair of training input data items; it may be symmetric (i.e. with respect to interchange of the data items). The kernel function may effectively define a linear operator, and the feature representations may then approximate eigenfunctions of this operator. For example the kernel function may penalize a metric of the difference between the pair of training input data items. Use of a kernel can facilitate determining such feature representations for very large data sets e.g. video data, e.g. where it may not be practical to represent all the data in memory at any one time. The kernel-weighted mini-batch covariance estimate may weight the covariance within the pair of training input data items using i.e. by, the kernel function.

The Jacobian update may comprise a Jacobian of the covariance measure update, or an approximation thereof, e.g. based on a moving average of the Jacobian. Similarly the covariance (measure) update may be based on a moving average of the covariance measure. Using moving averages helps to correct for biases in the gradient update which would otherwise be present. Thus in some implementations updating the covariance measure may comprise interpolating between the covariance measure and the covariance measure update in accordance with a first decay rate. Similarly updating the Jacobian of the covariance measure may comprise interpolating between the Jacobian and the Jacobian update in accordance with a second decay rate. The first and second decay rates may be the same or different, and may change with time. In implementations this may be referred to as bilevel optimization.

In some implementations determining a gradient estimate with respect to the network parameters may comprise determining a Cholesky decomposition of the updated covariance measure; determining, from the kernel-weighted mini-batch covariance estimate and the Cholesky decomposition, a normalized kernel-weighted covariance; and determining the gradient estimate using the Cholesky decomposition, the normalized kernel-weighted covariance, the kernel-weighted mini-batch covariance estimate, and the updated Jacobian of the covariance measure. In theory determining approximate eigenfunctions is a sequential process in which each solution depends on the previous solutions. However using a Cholesky decomposition as described above facilitates a parallel computation which may be used e.g. in an online data processing system.

In some implementations, but not essentially, determining the gradient estimate comprises determining a Jacobian of the kernel-weighted mini-batch covariance estimate, and determining the gradient estimate using the Cholesky decomposition, the normalized kernel-weighted covariance, the Jacobian of the kernel-weighted mini-batch covariance estimate, and the updated Jacobian of the covariance measure.

In some applications the input data items comprise images or other sensor data captured by a mechanical agent as the agent interacts with an environment. The method may then further comprise using the neural network to generate the feature representations for use by a reinforcement learning system controlling the agent to perform a task. The neural network may be trained first and/or jointly with the reinforcement learning system. The reinforcement learning system uses the feature representations to learn to control the agent. This can help the reinforcement learning system to learn faster and/or with reduced memory and computational resources, and to achieve improved performance on the task, for example arising from better exploration of the environment. The reinforcement learning system may be of any type e.g. a policy-based system such as Advantage Actor Critic (A3C—Mnih et al. 2016), or a Q-learning system, or a distributed reinforcement learning system such as IMPALA (Importance-Weighted Actor-Learner, Espholt et al., arXiv: 1802.01561). The reinforcement learning system may provide an action selection output for selecting an action or directly defining an action to be performed by the agent. The environment may be real-world or simulated; agents may comprise machines such robots or autonomous land, sea, or air vehicles or software agents i.e. computer programs configured to operate autonomously and/or with other software agents or people to perform a task such as configuration or maintenance of a computer or communications network or configuration or maintenance of a manufacturing plant or data center/server farm.

The input data items may comprise images or video frames, e.g. from a camera or LIDAR sensor. A feature representation generated by the (trained) neural network may be provided as an input to an image or video processing system, which may then perform a higher level task on the feature representation e.g. a classification, object tracking or gesture recognition task.

Particular embodiments of the subject matter described in this specification can be implemented so as to realize one or more of the following advantages.

By training a neural network as described in this specification, the trained neural network can generate feature representations that more accurately characterize the underlying input data items. That is, training the neural network as described in this specification results in feature representations being generated that are useful representations of data items for many different down-stream tasks. Additionally, the training scheme described in this specification addresses the bias in gradients that is introduced due to the finite batch size (this finite batch size is required to make training of large neural networks computationally feasible), allowing the neural network to be effectively trained on large data sets. Moreover, the described training scheme allows for online, parallel learning of multiple eigenfunctions, decreasing the training time and computational resources consumed in learning multi-eigenfunction feature representations. These aspects make the described techniques particularly suitable for training a neural network to generate representations of high-dimensional time series data.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
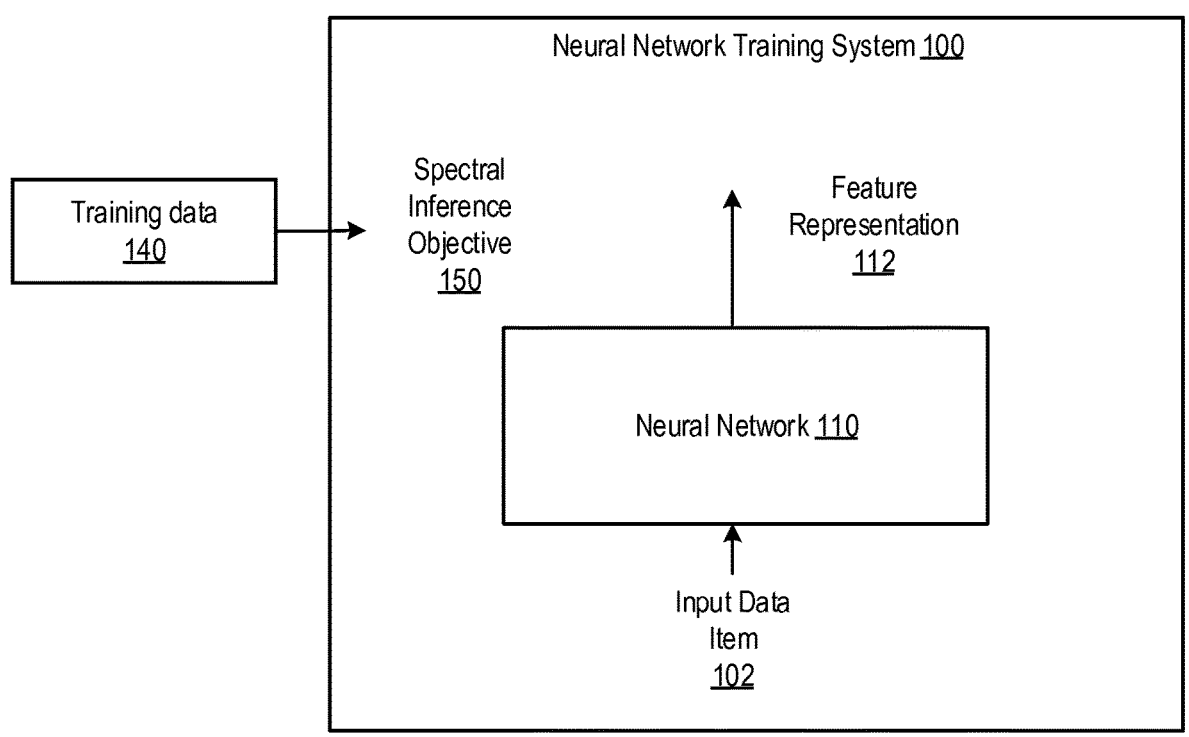
FIG. 1 shows an example neural network training system.

FIG. 1 shows an example neural network training system 100. The neural network training system 100 is an example of a system implemented as computer programs on one or more computers in one or more locations, in which the systems, components, and techniques described below can be implemented.

The neural network training system 100 is a system that trains a neural network 110 on training data 140 to determine trained values of the parameters of the neural network 110, referred to in this specification as network parameters, from initial values of the network parameters.

The neural network 110 is a neural network that is configured to receive an input data item 102 and to process the input data item to generate a feature representation 112 of the input data item 102 in accordance with the network parameters. Generally, a feature representation of a data item is an ordered collection of numeric values, e.g., a vector, that represents the data item as a point in a multi-dimensional feature space. In other words, each feature representation includes numeric values for each of a plurality of features of the input data item.

Once trained, the positions of feature representations in the multi-dimensional space generated by the neural network 110 can reflect similarities between the data items that the feature representations represent.

The neural network 110 can be configured to receive as input any kind of digital data input and to generate a feature representation from the input. For example, the input data items, also referred to as network inputs, can be images, portions of documents, text sequences, audio data, medical data, and so on.

The neural network 110 can have any architecture that is appropriate for the type of network inputs processed by the neural network 110. For example, when the network inputs are images, the neural network 110 can be a convolutional neural network. For example, the feature representations can be the outputs of a final convolutional layer of the neural network. As a particular example, the feature representations can be the output of a layer that would have been an intermediate layer of a convolutional neural network for performing image classification or other image processing task, e.g., the Inception network described in C. Szegedy, W. Liu, Y. Jia, P. Sermanet, S. Reed, D. Anguelov, D. Erhan, V. Vanhoucke, and A. Rabinovich, Going deeper with convolutions, in CVPR, 2015.

As a particular example, the techniques described in this specification may be particularly well suited for training a neural network that generates representations of high-dimensional time series data. Time series data is data that varies over time, i.e., that can be represented as points on a time series.

An example of high-dimensional time series data are sequences of images that are organized by the time at which the image was taken. For example, the input data items can be video frames from videos.

Another example of high-dimensional time series data are environment observations captured by a mechanical agent. Environment observations are images and/or other sensor data captured by the sensors of a mechanical agent, e.g., a robot or an autonomous vehicle, as the agent interacts with an environment guided by a reinforcement learning system or other control policy.

Once trained, the feature representations generated by the network 110 can be used for any of a variety of purposes.

For example, the system 100 can provide feature representations generated by the trained neural network as input to another system as features of the corresponding network inputs, e.g., for use in performing a machine learning task on the network inputs. Example tasks may include feature based retrieval, clustering, near duplicate detection, verification, feature matching, domain adaptation, video based weakly supervised learning, and so on.

As another example, the system 100 can use a feature representation generated by the trained neural network to classify the corresponding network input. As a particular example, the system can maintain data identifying a respective metoid, i.e., a respective representative point in the feature representation space, for each of a set of multiple possible classes. The system 100 can then classify a network input as belonging to the class represented by the metoid that is closest to the feature representation generated for the network input by the trained neural network. As another particular example, the system can train a classifier that processes feature representations generated by the trained neural network to classify the underlying data items.

As another example, when the data items are video frames, the feature representations can be used as input to a system that performs a higher-level task on the video frames. For example, the feature representations can be provided as input to a machine learning or other system that performs object tracking across video frames. As another example, the feature representations can be provided as input to a machine learning or other system that performs gesture recognition of gestures that are performed by entities depicted in the video.

As another example, when the data items are environment observations, the feature representations can be used by the reinforcement learning system to improve control of the agent, i.e., to improve the performance of the agent on some specified task. For example, the feature representations can be used by the reinforcement learning system for exploration, i.e., to select actions that allow the agent to explore under-visited locations in the environment that may be beneficial in performing a task, or to discover subgoals in the environment, e.g., states of the environment or locations in the environment that, when reached or encountered, are beneficial to accomplishing the overall goal and completing the task.

The training data 140 that is used by the system 100 to train the neural network 110 includes multiple mini-batches of training inputs. Each mini-batch of training inputs includes a fixed number of pairs of training inputs.

The system 100 trains the neural network 110 on the training data 140 by optimizing a spectral inference objective 150. A neural network that has been trained on such an objective can be referred to as a "spectral inference neural network."

In particular, the spectral inference objective 150 is an objective that trains the neural network to generate feature representations that approximate eigenfunctions of a linear operator that is derived from a kernel function that measures the similarity between a pair of data items by comparing the feature representations of the pair. In other words, each feature in the feature representation approximates the output of a different eigenfunction of the linear operator. The eigenvectors themselves cannot be represented explicitly in memory. The state space of interest can be combinatorically large or continuous and high dimensional. By choosing a function approximator known to work well in a certain domain, the system 100 can bias the feature representation towards reasonable solutions in a way that is difficult to encode by choice of kernel. The system 100 can approximate eigenfunctions of linear operators on high dimensional function spaces with neural networks.

Many different kernel functions may be employed. As one example, the kernel function k may be a function that penalizes distances between pairs of the training input data items such that k satisfies:

$$k(x, x') = \frac{(u(x) - u(x'))(u(x) - u(x'))^T}{u(x)u(x')}.$$

where u(x) is the feature representation for the first input data item in the pair and u(x') is the feature representation for the second input data item in the pair. The kernel function allows the system 100 to approximate u(x) when a larger matrix that can directly compute the eigenvalues is too large to represent in memory. As will be described in more detail below, using such a kernel function and applying the kernel function to temporally adjacent inputs during training can allow the system to train the neural network to generate similar feature representations for temporally adjacent inputs.

In particular, the system 100 can train a neural network that generates M dimensional feature representations, i.e., feature representations that include values for M features, to approximate the top M eigenfunctions. This can be achieved, in broad terms, by optimizing the following spectral inference objective:

$$\max_u Tr(E_x[u(x)u(x)^T]^{-1} E_{x,x'}[k(x, x')u(x)u(x')^T],$$

where Tr is the trace function and E is the expectation function. However this objective may be re-expressed in many different ways, and approximated or simplified (e.g. the double expectation over x and x' may be replaced with a single expectation). The procedure described in the summary and below illustrates an implementation which can optimize this objective.

Training the neural network 110 to approximate the top M eigenfunctions results in the neural network learning to generate meaningful feature representations that capture meaningful properties of the underlying data inputs in an entirely unsupervised manner.

Directly training the neural network 110 on this objective, i.e., by directly backpropagating gradients, can be difficult because unbiased estimates of gradients with respect to the network parameters of this objective are not possible to compute due to the use of finite mini-batch sizes. In other words, training the neural network with finite mini-batch sizes on this objective using conventional techniques results in biased gradient estimates. Instead, to overcome this bias and to train the neural network to generate high quality representations, the system optimizes the spectral inference objective 150 using a bilevel optimization technique that employs moving averages of covariance measures of the features in the feature representations and the Jacobian of the covariance measures during training.

By using the described bilevel optimization technique, the system 100 can effectively train the neural network 110 even on very large data sets and for very high-dimensional data, e.g., large data sets of video frames or environment observations. Because these data sets can be collected in an unsupervised manner, i.e., without requiring the data to be labelled, the system 100 can effectively leverage the large amount of unlabeled data that can easily be collected in various domains in training the neural network 110.

Training the neural network 110 on this objective using bilevel optimization is described in more detail below with reference to FIGS. 2 and 3.

Once the neural network has been trained, the system 100 provides data specifying the trained neural network for use in processing new network inputs. That is, the system 100 can output, e.g., by outputting to a user device or by storing in a memory accessible to the system 100, the trained values of the network parameters for later use in processing inputs using the trained neural network. Alternatively or in addition to outputting the trained neural network data, the system 100 can instantiate an instance of the neural network having the trained values of the network parameters, receive inputs to be processed, e.g., through an application programming interface (API) offered by the system, use the trained neural network to process the received inputs to generate feature representations, and then provide the generated feature representations in response to the received inputs.

Figure 2:
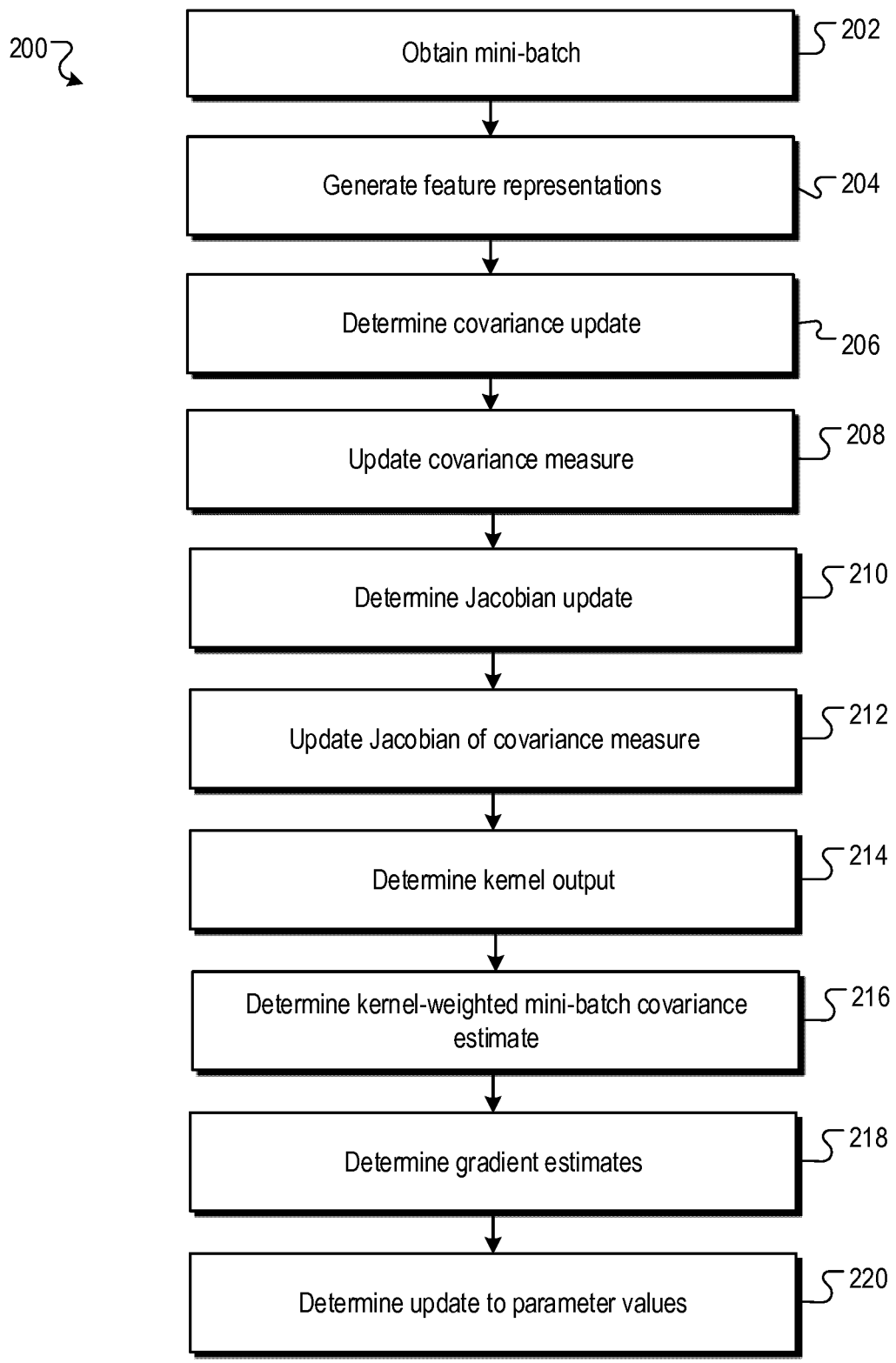
FIG. 2 is a flow diagram of an example process for training a neural network on a spectral inference objective.

FIG. 2 is a flow diagram of an example process 200 for training a neural network on a mini-batch of training data. For convenience, the process 200 will be described as being performed by a system of one or more computers located in one or more locations. For example, a neural network training system, e.g., the neural network training system 100 of FIG. 1, appropriately programmed, can perform the process 200.

The system can repeatedly perform the process 200 on multiple different mini-batches of training items to determine trained values of the network parameters from initial values of the network parameters.

During the training, the system maintains a covariance measure of the features in the feature representations generated by the neural network and a Jacobian measure of the covariance measure. While this measure is referred to in this specification as a "covariance" measure the measure may actually represent an approximation of either the covariance of the features (when the features are zero mean) or the second moment of the features (when the features are not zero mean). At the outset of training, the system can initialize the covariance measure and the Jacobian to be zero. Generally, however, at any given point during the training, the Jacobian measure is an approximation of the Jacobian of the covariance measure, i.e., the matrix of first-order partial derivatives of the covariance measure with respect to the network parameters.

The system obtains a mini-batch that includes multiple pairs of training input data items (step 202). For example, when the input data items are time series data, the two input data items in any given pair may be adjacent data items from the time series. As a particular example, when the inputs to the neural network are video frames, the two input data items in each pair may be adjacent video frames in an input video. As another example, when the inputs to the neural network are environment observations, the two input data items in each pair may be temporally adjacent observations.

The system processes each training item in the mini-batch using the neural network and in accordance with current values of the network parameters to generate a respective feature representation for each of the training items (step 204). As described above, each feature representations includes a numeric value for each of a fixed number of features.

The system determines a covariance update to the covariance measure (step 206). In particular, the covariance update $\hat{\Sigma}_t$ satisfies:

$$\hat{\Sigma}_t = .5\left(\frac{1}{N}\Sigma_i(u(x_{ti})u(x_{ti})^T) + \frac{1}{N}\Sigma_i(u(x'_{ti})u(x'_{ti})^T)\right),$$

where N is the total number of pairs in the mini-batch, $x_{ti}$ is the first training item in the i-th pair, $x'_{ti}$ is the second training item in the i-th pair, i ranges over all of the pairs in the mini-batch, $u(x_{ti})$ is the feature representation for the first training item in the i-th pair, and $u(x'_{ti})$ is the feature representation for the second training item in the i-th pair.

In some implementations, the system augments the training by adding a constant first eigenfunction to the features output by the neural network in the equation above and the equations that follow, i.e., so that each feature representation used in the calculation above and those described below is augmented with a first feature that always has the same constant value. This is equivalent to forcing the features to be zero-mean and may cause the training to converge faster, i.e., in fewer training iterations.

The system updates, using the covariance measure update, the covariance measure (step 208). In particular, the system interpolates between the covariance measure and the covariance measure update in accordance with a first decay rate. In other words the updated covariance measure $\Sigma_t$ satisfies:

$$\Sigma_t = (1-\beta_t)\Sigma_{t-1} + \beta_t\hat{\Sigma}_t,$$

$\beta_t$ is the first decay rate, $\Sigma_{t-1}$ and is the maintained covariance measure before the update. Thus, as part of the bilevel optimization scheme, the system maintains and updates a moving average of the covariance measure during the training.

The system determines, from the covariance measure update, a Jacobian update to the Jacobian of the covariance measure (step 210). In other words, the system computes either the Jacobian of the covariance measure update with respect to the network parameters or an approximation of the Jacobian of the covariance measure update with respect to the network parameters.

The system updates, using the Jacobian update, the Jacobian of the covariance measure (step 212). In particular, the system interpolates between the Jacobian and the Jacobian update in accordance with a second decay rate. In other words the updated Jacobian $\bar{J}_t$ satisfies:

$$\bar{J}_t = (1-\alpha_t)\bar{J}_{t-1} + \alpha_t\hat{J}_t$$

$\alpha_t$ is the first decay rate, and $\bar{J}_{t-1}$ is the maintained Jacobian before the update. Thus, as part of the bilevel optimization scheme, the system maintains and updates a moving average of the Jacobian of the covariance measure during the training.

In some implementations, the first and second decay rates are different. In other implementations, however, the first and second decay rates are the same. Moreover, in some implementations, the decay rates change, e.g., decrease, throughout training while in other implementations the decay rates are held constant throughout training.

The system determines, for each pair of training input data items, a respective kernel output (step 214). In other words, the system determines, for each pair of training input data items, the output of the kernel function that measures similarities between the feature representations of the features of the kernel. As described above, the kernel function k may be one that penalizes distances between pairs of the training input data items such that k satisfies:

$$k(x, x') = \frac{(u(x) - u(x'))(u(x) - u(x'))^T}{u(x)u(x')}.$$

By using such a kernel function when determining parameter updates the system trains the neural network to generate similar feature representations for temporally adjacent inputs.

The system determines, from the respective feature representations of each pair of training input data items in the mini-batch and the respective kernel output for each pair of training input data items, a kernel-weighted mini-batch covariance estimate (step 216). The kernel-weighted mini-batch covariance estimate is an estimate of the covariance within pairs of inputs in the mini-batch that accounts for the kernel outputs for the pair of training input data items, i.e., so that pairs of training inputs with higher covariance measures contribute more to the covariance estimate. In particular, the kernel-weighted mini-batch covariance $\hat{\Pi}_t$ satisfies:

$$\hat{\Pi}_t = \frac{1}{N}\Sigma_i k(x_{ti}, x'_{ti})u(x_{ti})u(x'_{ti})^T.$$

The system determines, using the updated Jacobian of the covariance measure, the updated covariance measure, and the kernel-weighted mini-batch covariance estimate, a gradient estimate with respect to the network parameters (step 218). Determining the gradient estimate is described in more detail below with reference to FIG. 3.

The system updates the current values of the network parameters using the gradient estimate (step 220). In particular, the system determines an update to the current values using the gradient estimate in accordance with an update rule for an optimizer, e.g., the Adam update rule, the rmsProp update rule, or the stochastic gradient descent update rule, that is being used for the training. The system then adds the update to the current values to determine updated values of the network parameters.

Figure 3:
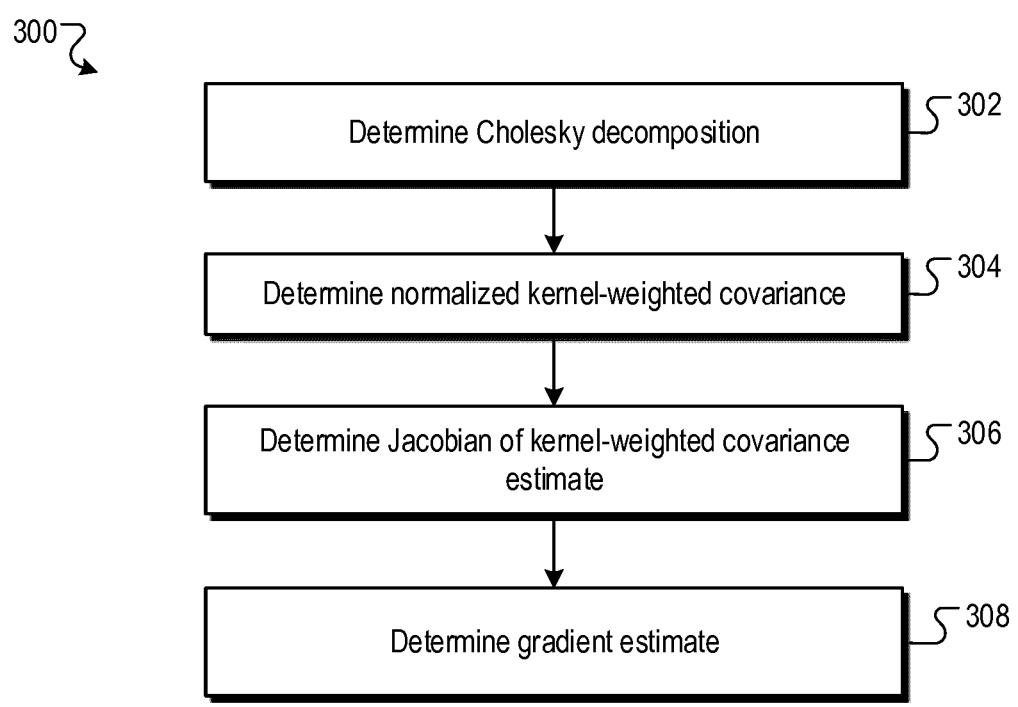
FIG. 3 is a flow diagram of an example process for determining a gradient estimate of the spectral inference objective.

FIG. 3 is a flow diagram of an example process 300 for determining a gradient estimate with respect to the network parameters of the spectral inference objective. For convenience, the process 300 will be described as being performed by a system of one or more computers located in one or more locations. For example, a neural network training system, e.g., the neural network training system 100 of FIG. 1, appropriately programmed, can perform the process 300.

The system can perform the process 300 during the training of the neural network on a mini-batch of training inputs to determine a gradient estimate for the mini-batch. The system can then determine an update to the network parameters using the gradient estimate and then apply, i.e., add, the update to the current network parameter values to generate updated values of the network parameters.

The system determines a Cholesky decomposition of the updated covariance measure (step 302). In particular, the Cholesky decomposition of the updated covariance measure is the matrix L such that the updated covariance measure is equal to the product of L and the conjugate transpose of L. The Cholesky decomposition can be computed using any of a variety of known algorithms, e.g., the Cholesky algorithm, the Cholesky-Banachiewicz algorithm, or the Cholesky-Crout algorithm.

The system determines, from the kernel-weighted mini-batch covariance estimate and the Cholesky decomposition, a normalized kernel-weighted covariance (step 304). In particular, the normalized kernel-weighted covariance $\Lambda$ satisfies:

$$\Lambda = L^{-1}\hat{\Pi}_t L^{-T},$$

where L is the Cholesky decomposition.

The system determines a Jacobian of the kernel-weighted mini-batch covariance estimate (step 306). That is, the system computes the Jacobian of the kernel-weighted mini-batch covariance with respect to the network parameters.

The system determines the gradient estimate using the Cholesky decomposition, the normalized kernel-weighted covariance, the Jacobian of the kernel-weighted mini-batch covariance, and the updated Jacobian of the covariance measure (step 308).

In particular, the gradient estimate satisfies:

$$E[J_\Pi(L^{-T}\mathrm{diag}(L)^{-1})] - E[J_\Sigma(L^{-T}\mathrm{triu}(\Lambda\mathrm{diag}(L)^{-1}))],$$

where L is the Cholesky decomposition, diag is a function that returns the diagonal of an input matrix, triu is a function that returns the upper triangular of an input matrix, $J_\Pi(A)$ is a linear operator that denotes left-multiplication of the Jacobian of the kernel-weighted mini-batch covariance by A, and $J_\Sigma(A)$ is a linear operator that denotes left-multiplication of the Jacobian of the covariance measure by A, e.g. $J_\Pi(A) = k(x, x')u(x)^T A \frac{\partial u}{\partial \theta} J_\Sigma(A) = u(x)^T A \frac{\partial u}{\partial \theta}$ where $\theta$ are the network parameters.

By using the above as the estimate of the gradient of the spectral inference objective, the system effectively masks the flow of information from the gradient of the spectral inference objective to ensure that the resulting feature representations will approximate the top M eigenfunctions of the linear operator. That is, the above approach facilitates determining the eigenfunctions simultaneously e.g. in an online setting, rather than solving a sequence of optimization functions for the eigenfunctions.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of training a neural network having a plurality of network parameters and the neural network being configured to process an input data item to generate a feature representation comprising values for each of a plurality of features of the input data item, the method comprising:

obtaining a training data set for training the neural network; and training the neural network on the training data set to generate feature representations that approximate eigenvalues of input images or videos and that fit in memory for performing a task that operates on the feature representations of an input sequence of images or videos, wherein the sequence of images or videos are high-dimensional time series data, the training comprising:

maintaining a covariance measure of the features and a Jacobian of the covariance measure;

receiving a mini-batch comprising a plurality of pairs of training input data items, wherein each training input data item comprises a video frame of the input sequence of images or videos, respectively; and training the neural network on the mini-batch, the training comprising:

processing each training input data item in the mini-batch using the neural network in accordance with current values of the network parameters to generate a respective feature representation of each of the training input data items;

determining, from the respective feature representations of each pair of training input data items in the mini-batch, a covariance measure update to the covariance measure;

updating, using the covariance measure update, the covariance measure;

determining, from the covariance measure update, a Jacobian update to the Jacobian of the covariance measure;

updating, using the Jacobian update, the Jacobian of the covariance measure;

determining, for each pair of training input data items, a respective kernel output;

determining, from the respective feature representations of each pair of training input data items in the mini-batch and the respective kernel output for each pair of training input data items, a kernel-weighted mini-batch covariance estimate;

determining, using the updated Jacobian of the covariance measure, the updated covariance measure, and the kernel-weighted mini-batch covariance estimate, a gradient estimate with respect to the network parameters; and updating the current values of the network parameters using the gradient estimate.

2. The method of claim 1, wherein the Jacobian update is a Jacobian of the covariance measure update.

3. The method of claim 1, wherein the Jacobian update is an approximation of a Jacobian of the covariance measure update.

4. The method of claim 1, wherein updating, using the covariance measure update, the covariance measure comprises:

interpolating between the covariance measure and the covariance measure update in accordance with a first decay rate.

5. The method of claim 4, wherein updating, using the Jacobian update, the Jacobian of the covariance measure comprises:

interpolating between the Jacobian and the Jacobian update in accordance with a second decay rate.

6. The method of claim 5 wherein the first and second decay rate are the same.

7. The method of claim 1, wherein determining, using the updated Jacobian of the covariance measure, the updated covariance measure, and the kernel-weighted mini-batch covariance estimate, a gradient estimate with respect to the network parameters comprises:
- determining a Cholesky decomposition of the updated covariance measure;
- determining, from the kernel-weighted mini-batch covariance estimate and the Cholesky decomposition, a normalized kernel-weighted covariance; and
- determining the gradient estimate using the Cholesky decomposition, the normalized kernel-weighted covariance, the kernel-weighted mini-batch covariance estimate, and the updated Jacobian of the covariance measure.

8. The method of claim 7, wherein determining, using the updated Jacobian of the covariance measure, the updated covariance measure, and the kernel-weighted mini-batch covariance estimate, a gradient estimate with respect to the network parameters comprises:
- determining a Jacobian of the kernel-weighted mini-batch covariance estimate; and
- determining the gradient estimate using the Cholesky decomposition, the normalized kernel-weighted covariance, the Jacobian of the kernel-weighted mini-batch covariance estimate, and the updated Jacobian of the covariance measure.

9. The method of claim 1, wherein the input data items comprise images captured by a mechanical agent as the agent interacts with an environment, the method further comprising using the neural network to generate the feature representations for use by a reinforcement learning system controlling the agent to perform a task.

10. The method of claim 1, further comprising, after the training of the neural network, using the neural network to perform an image or video recognition task.

11. The method of claim 1, further comprising:
- after the training, receiving a new input data item that comprises an image or a video;
- processing the new input data item using the neural network to generate a feature representation of the new data item; and
- storing the feature of the new data item in the memory for performing the task.

12. The method of claim 11, further comprising:
performing the task on the new data item.

13. A system comprising one or more computers and one or more storage devices storing instructions that when executed by the one or more computers cause the one or more computers to perform operations for training a neural network having a plurality of network parameters and the neural network being configured to process an input data item to generate a feature representation comprising values for each of a plurality of features of the input data item, the operations comprising:
- obtaining a training data set for training the neural network; and
- training the neural network on the training data set to generate feature representations that approximate eigenvalues of input images or videos and that fit in memory for performing a task that operates on the feature representations of an input sequence of images or videos, wherein the sequence of images or videos are high-dimensional time series data, the training comprising:
  - maintaining a covariance measure of the features and a Jacobian of the covariance measure;
  - receiving a mini-batch comprising a plurality of pairs of training input data items, wherein each training input data item comprises a video frame of the input sequence of images or videos, respectively; and
  - training the neural network on the mini-batch, the training comprising:
    - processing each training input data item in the mini-batch using the neural network in accordance with current values of the network parameters to generate a respective feature representation of each of the training input data items;
    - determining, from the respective feature representations of each pair of training input data items in the mini-batch, a covariance measure update to the covariance measure;
    - updating, using the covariance measure update, the covariance measure;
    - determining, from the covariance measure update, a Jacobian update to the Jacobian of the covariance measure;
    - updating, using the Jacobian update, the Jacobian of the covariance measure;
    - determining, for each pair of training input data items, a respective kernel output;
    - determining, from the respective feature representations of each pair of training input data items in the mini-batch and the respective kernel output for each pair of training input data items, a kernel-weighted mini-batch covariance estimate;
    - determining, using the updated Jacobian of the covariance measure, the updated covariance measure, and the kernel-weighted mini-batch covariance estimate, a gradient estimate with respect to the network parameters; and
    - updating the current values of the network parameters using the gradient estimate.

14. The system of claim 13, wherein the Jacobian update is a Jacobian of the covariance measure update.

15. The system of claim 13, wherein the Jacobian update is an approximation of a Jacobian of the covariance measure update.

16. The system of claim 13, wherein updating, using the covariance measure update, the covariance measure comprises:
interpolating between the covariance measure and the covariance measure update in accordance with a first decay rate.

17. The system of claim 16, wherein updating, using the Jacobian update, the Jacobian of the covariance measure comprises:
interpolating between the Jacobian and the Jacobian update in accordance with a second decay rate.

18. One or more non-transitory computer-readable storage media storing instructions that when executed by one or more computers cause the one or more computers to perform operations for training a neural network having a plurality of network parameters and the neural network being configured to process an input data item to generate a feature representation comprising values for each of a plurality of features of the input data item, the operations comprising:
- obtaining a training data set for training the neural network; and
- training the neural network on the training data set to generate feature representations that approximate eigenvalues of input images or videos and that fit in memory for performing a task that operates on the feature representations of an input sequence of images or videos, wherein the sequence of images or videos are high-dimensional time series data, the training comprising:
  maintaining a covariance measure of the features and a Jacobian of the covariance measure;
  receiving a mini-batch comprising a plurality of pairs of training input data items, wherein each training input data item comprises a video frame of the input sequence of images or videos, respectively; and
  training the neural network on the mini-batch, the training comprising:
    processing each training input data item in the mini-batch using the neural network in accordance with current values of the network parameters to generate a respective feature representation of each of the training input data items;
    determining, from the respective feature representations of each pair of training input data items in the mini-batch, a covariance measure update to the covariance measure;
    updating, using the covariance measure update, the covariance measure;
    determining, from the covariance measure update, a Jacobian update to the Jacobian of the covariance measure;
    updating, using the Jacobian update, the Jacobian of the covariance measure;
    determining, for each pair of training input data items, a respective kernel output;
    determining, from the respective feature representations of each pair of training input data items in the mini-batch and the respective kernel output for each pair of training input data items, a kernel-weighted mini-batch covariance estimate;
    determining, using the updated Jacobian of the covariance measure, the updated covariance measure, and the kernel-weighted mini-batch covariance estimate, a gradient estimate with respect to the network parameters; and
    updating the current values of the network parameters using the gradient estimate.

* * * * *